FIG. 9

June 18, 1957  F. A. VAN VLECK  2,796,179
BOX STACKING MACHINE
Filed May 6, 1952  13 Sheets-Sheet 8

INVENTOR.
Forest A. Van Vleck
BY
ATTYS

INVENTOR
Forest A. VanVleck
BY
Webster + Webster
ATTYS

June 18, 1957   F. A. VAN VLECK   2,796,179
BOX STACKING MACHINE
Filed May 6, 1952   13 Sheets-Sheet 10

INVENTOR.
Forest A. Van Vleck
BY
ATTYS

June 18, 1957     F. A. VAN VLECK     2,796,179
BOX STACKING MACHINE Filed May 6, 1952                                13 Sheets-Sheet 12

INVENTOR.
Forest A. Van Vleck
BY
ATTYS

FIG. 23

United States Patent Office 2,796,179
Patented June 18, 1957

2,796,179

BOX STACKING MACHINE

Forest A. Van Vleck, Placerville, Calif.

Application May 6, 1952, Serial No. 286,257

6 Claims. (Cl. 214—6)

In the fruit and vegetable industry, particularly at packing houses, the produce boxes are stacked on pallets for transport from place to place by fork-lift trucks. Heretofore, the produce boxes have been stacked on each pallet by hand, which is a time and labor consuming task.

It is therefore a major object of the present invention to provide a machine which is operative, wholly automatically, to receive produce boxes from a conveyor; to place a predetermined number of boxes in a symmetrical stack on a pallet; and to discharge the loaded pallet to a position for ready access and pickup by a fork-lift truck.

Another important object of the invention is to provide a box stacking machine which is cyclic in operation, with the working patrs actuated by fluid pressure power cylinders; there being a box feed carriage worked by one power cylinder, a pallet supporting box-receiving hoist embodying another power cylinder, and a pallet ejector worked by a third power cylinder.

An additional object of the present invention is to provide a box stacking machine, as in the preceding paragraph, wherein said power cylinders are interposed in and operated by a novel valve controlled, fluid pressure conduit system; the valves of said system being operated in a predetermined sequence in order to properly cycle the machine; and such sequencing being in direct response to orderly movement of the working parts of the machine.

A further object of the invention is to provide a box stacking machine wherein a horizontally reciprocable carriage recurringly feeds row upon row of produce boxes onto a hoist-supported pallet; the hoist—from a raised starting position—lowering step by step to receive such rows; and an ejector working, when the hoist reaches a lowered stopping position, to shift the loaded pallet off said hoist and place an unloaded pallet thereon for reception of the next stack of boxes after the hoist has been returned to its raised starting position.

It is also an object of the invention to provide a box stacking machine which is smooth and positive in operation with a minimum of wear and tear on the boxes; of substantial capacity; and requiring no more than average servicing or repair.

Still another object of the invention is to provide a practical, reliable, and durable box stacking machine, and one which will be exceedingly effective for the purpose for which it is designed.

These objects are accomplished by means of such structure and relative arrangement of parts as will fully appear by a perusal of the following specification and claims.

Referring now more particularly to the characters of reference on the drawings, the produce boxes 1, filled with produce 2, are disposed transversely on—and fed by—an elevated roller conveyor 3 onto a power driven, endless belt conveyor 4.

The endless belt conveyor 4 is mounted to deliver three boxes at a time, side by side, onto an initially retracted, horizontally reciprocable, box-feed carriage 5 from one side of the latter.

The opposite side of the carriage is fitted with an upstanding, longitudinal side wall 6; the carriage being suspended by rollers 7 and rails 8 for horizontal reciprocation between its initially retracted position clear of, and in advanced position directly above, the cage or housing 9 defined by a rigid, upstanding main frame, indicated generally at 10. The main frame 10 has a solid rear wall 11, a solid side wall 12, and an opposite side wall of vertical rollers 13; such cage or housing 9 being open at the front, while the back wall terminates short of floor level for the purpose hereinafter described.

The carriage supporting rails 8 are mounted on, and project laterally from, the frame 10, with suitable additional framing support; the rail near the conveyor 4 terminating short thereof whereby to not obstruct delivery of boxes from said conveyor 4 onto the horizontal carriage 5. Other suitable guide rollers for the carriage are provided, as shown.

The carriage is adapted to be reciprocated, horizontally, by an elongated, fluid pressure actuated power cylinder 14 which is mounted above the rail 8 opposite conveyor 4, and the piston rod 15 of such cylinder 14 is connected to a rigid arm 16 which upstands from the side wall 6 adjacent its rear end.

The carriage 5 is formed with box receiving roller sections, one ahead of the other, relative to the direction of advance of the carriage, the forward roller section being indicated at 17, while the rearward roller section is indicated at 18.

At the outset—i. e. when the carriage 5 is in its retracted starting position, the forward roller section 17 is alined with the endless conveyor 4, whence three boxes deliver from such conveyor 4 onto said forward roller section 17. After three boxes so deliver onto the forward roller section 17, the remaining boxes on the conveyor 4 stand still, with the conveyor slipping thereunder.

Figure 7:
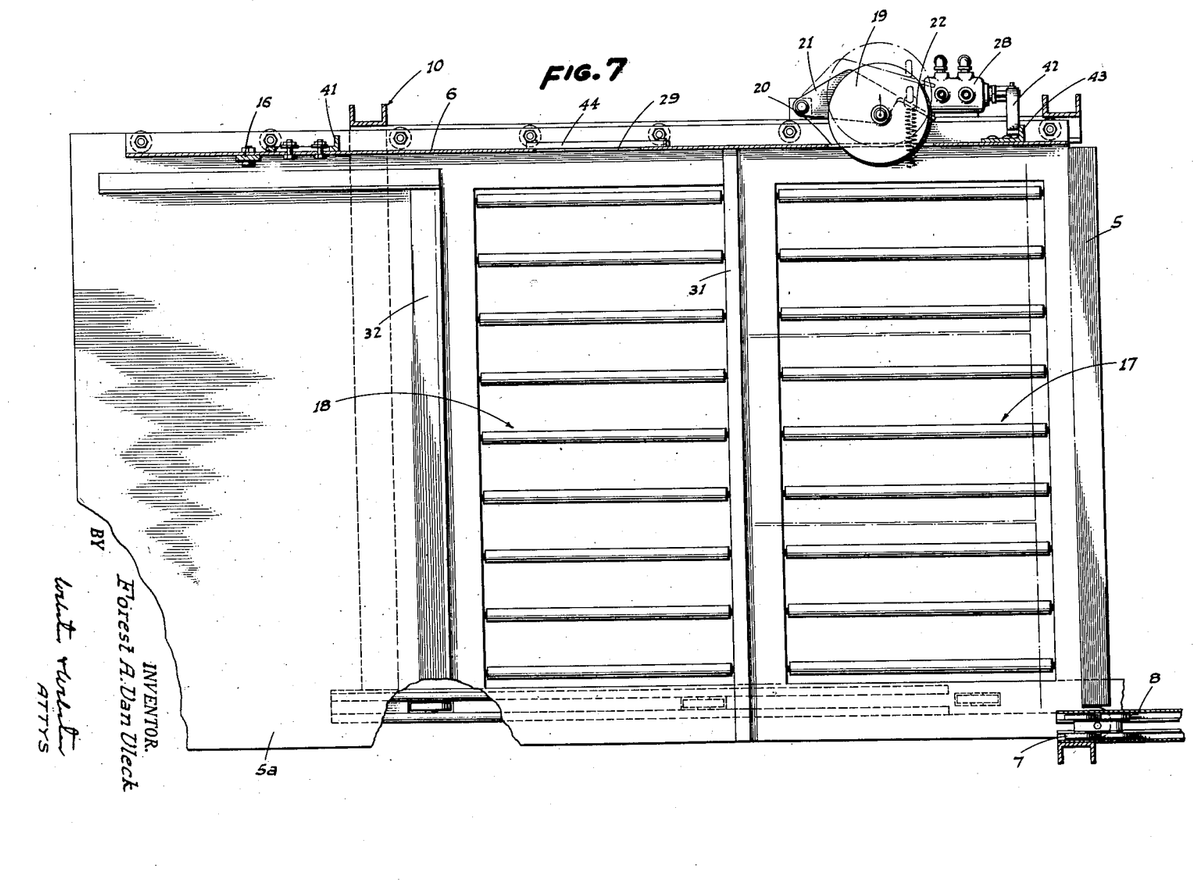
Fig. 7 is a fragmentary sectional plan on line 7—7 of Fig. 5.

Upon such three boxes coming to rest on the forward roller section 17, the foremost box engages and shifts forwardly a vertical-axis disc 19 which is initially projected through a slot 20 in the carriage side wall 6 by a spring-urged swing arm 21 (see Fig. 7). When the disc is shifted, as above, the swing arm 21 moves an upstanding lever arm 22 which opens an initially closed valve 23 suitably mounted on the adjacent side of the frame.

Figure 23:
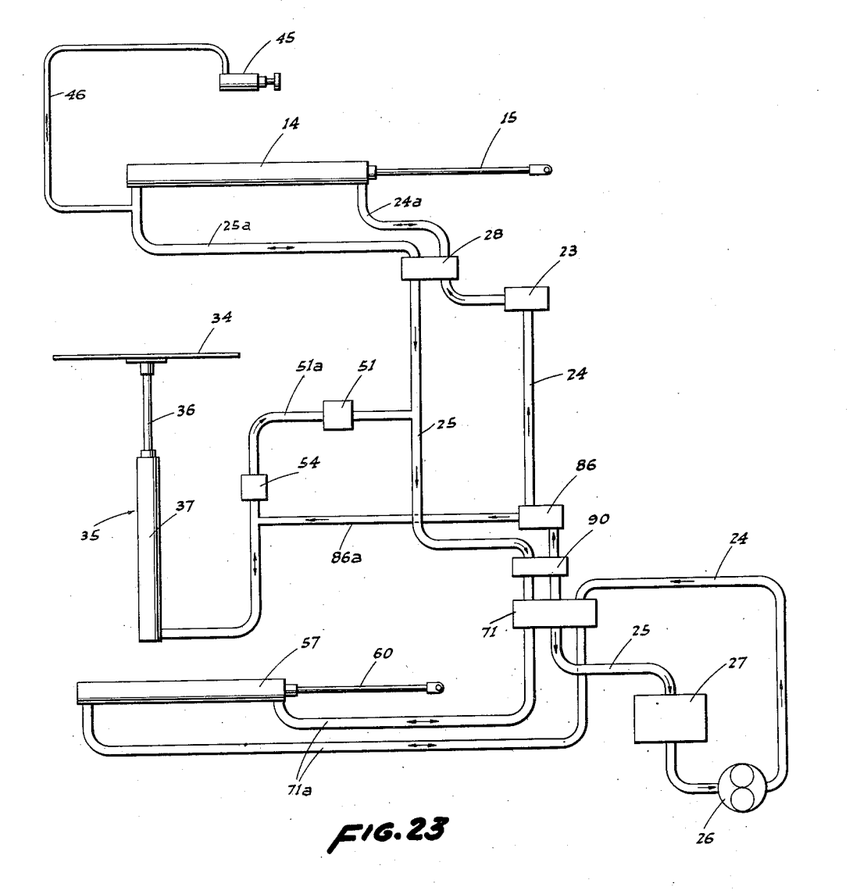
Fig. 23 is a diagrammatic view of the entire valve controlled fluid pressure conduit system.

The valve controlled, fluid pressure conduit system, as shown in full diagram in Fig. 23, includes a fluid pressure feed conduit 24 and a fluid pressure return conduit 25 in communication with a pump 26; there being a reservoir 27 in the conduit 25 adjacent the pump. The system is preferably of hydraulic type.

The valve 23 and an associated reversing valve 28 are interposed between conduits 24 and 25 and double-acting cylinder 14 in controlling relation to the latter; such cylinder being connected to the valves by conduits 24a and 25a.

Figure 10:
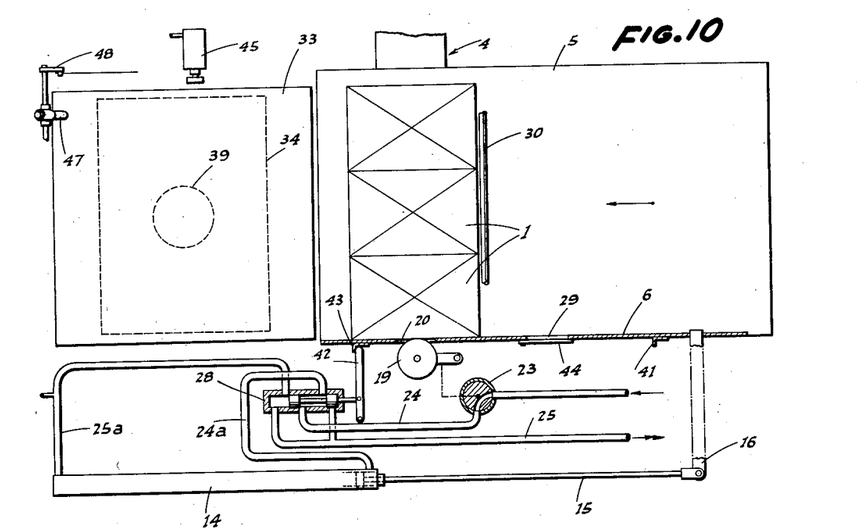
Figs. 10–13 inclusive are fragmentary diagrammatic plan views showing the sequential operations of the box feed carriage, including its power cylinder and the related control valves.
Figure 11:
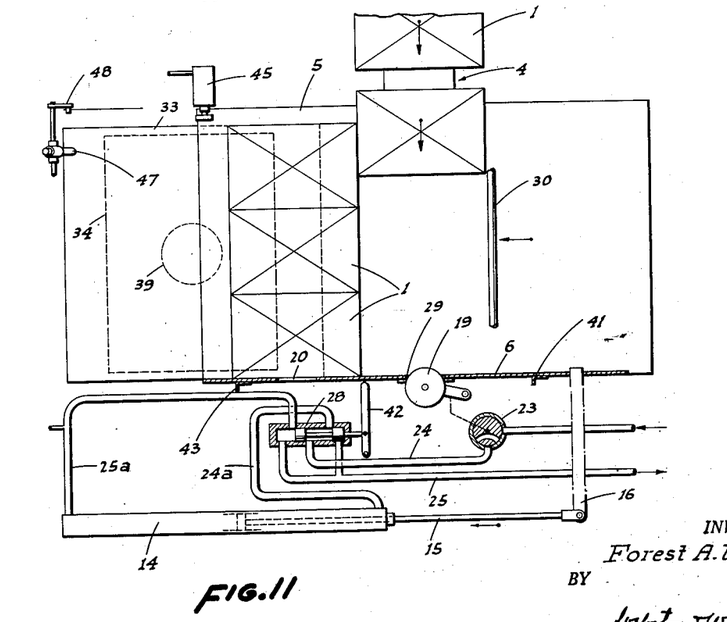

Upon valve 23 being initially opened (see Fig. 10), the cylinder 14 is energized and works in a direction to advance the carriage 5 a distance to bring the rearward roller section 18 into alinement with the endless conveyor 4. When the carriage 5 reaches such position the disc 19—which has ridden the outside of the side wall 6— drops through another slot 29 in said side wall, again closing the valve 23 and stopping the cylinder 14. With these parts in this position (see Fig. 11), another row of three boxes advances onto the carriage 5, being received on the rearward roller section 18.

The path of entry of each row of boxes from the endless conveyor 4 onto the carriage is defined on the rear side by a transverse guide bar 30 disposed above the carriage, being an extension of the corresponding one of the box guides 30a of conveyor 4.

At the longitudinally rear end of each of the roller sections 17 and 18, the same is formed with an upstanding transverse shoulder, indicated at 31 and 32, respectively. The purpose of such shoulders is to assure that the two rows of boxes as delivered to the carriage may be advanced forwardly by said carriage without the latter slipping under said boxes.

Figure 12:
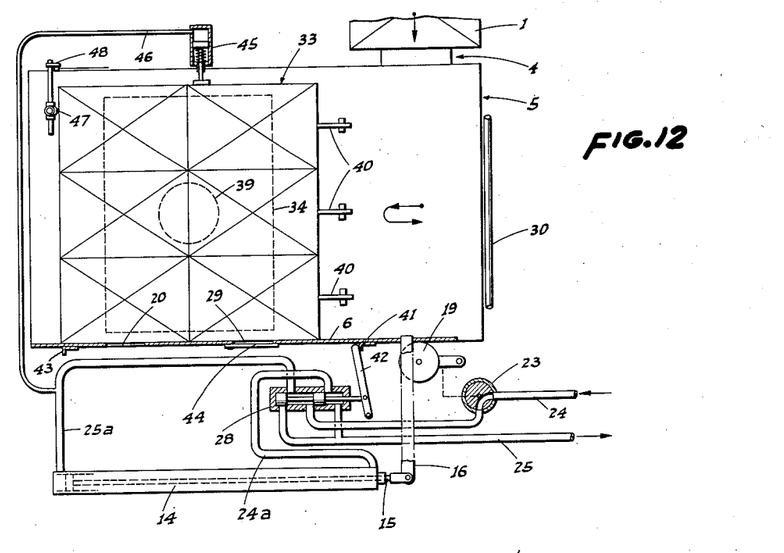

Upon the second row of three boxes being delivered onto the rearward roller section 18, the disc 19 is again engaged and shifted outwardly, again opening the valve 23, whereupon the power cylinder 14 completes the advancing stroke of the carriage 5 and disposes the box supporting roller sections 17 and 18 directly centered in the upper end of the cage or housing 9 (see Fig. 12).

The two rows of three boxes are now disposed directly above and in vertical alinement with a rectangular pallet 33 resting on the horizontal platform 34 of a hydraulic hoist or elevator, indicated generally at 35, which works in the cage or housing 9; such hoist including a vertical piston rod 36 which extends upwardly from a power cylinder 37 embedded in the floor. The platform 34 is maintained against turning by opposed vertical guides 38 which run in guided relation in a jacket 39 which surrounds the power cylinder 37 below floor level.

When the carriage 5 is fully advanced, a plurality of swing dogs 40, which have previously dragged across the top of the boxes, fall behind the same, whereby when the carriage 5 reverses and retracts to its starting position, to strip the boxes for dropping either directly onto the pallet 33, or onto other boxes previously deposited in the same manner thereon.

Figure 13:
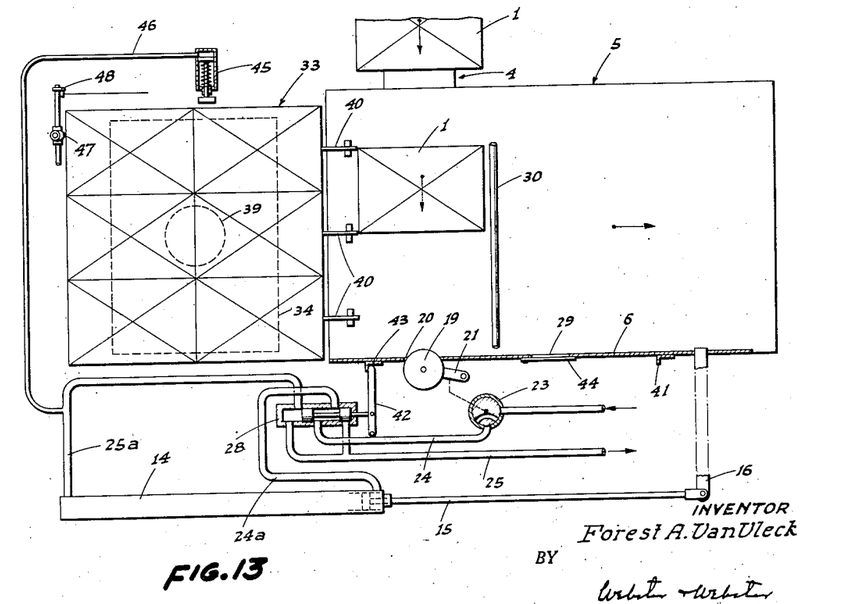

Reverse of the power cylinder 14 to so retract the carriage 5 is caused by an abutment 41 on the outside of the side wall 6 engaging and swinging a lever 42, which reverses the valve 28 (see Fig. 12); such valve remaining in reverse until the cylinder 14 has fully retracted the carriage, whence another abutment 43 on the side wall 6 engages the lever 42 and reverses the valve 28 to its starting position (see Fig. 13).

Figures 5, 6:
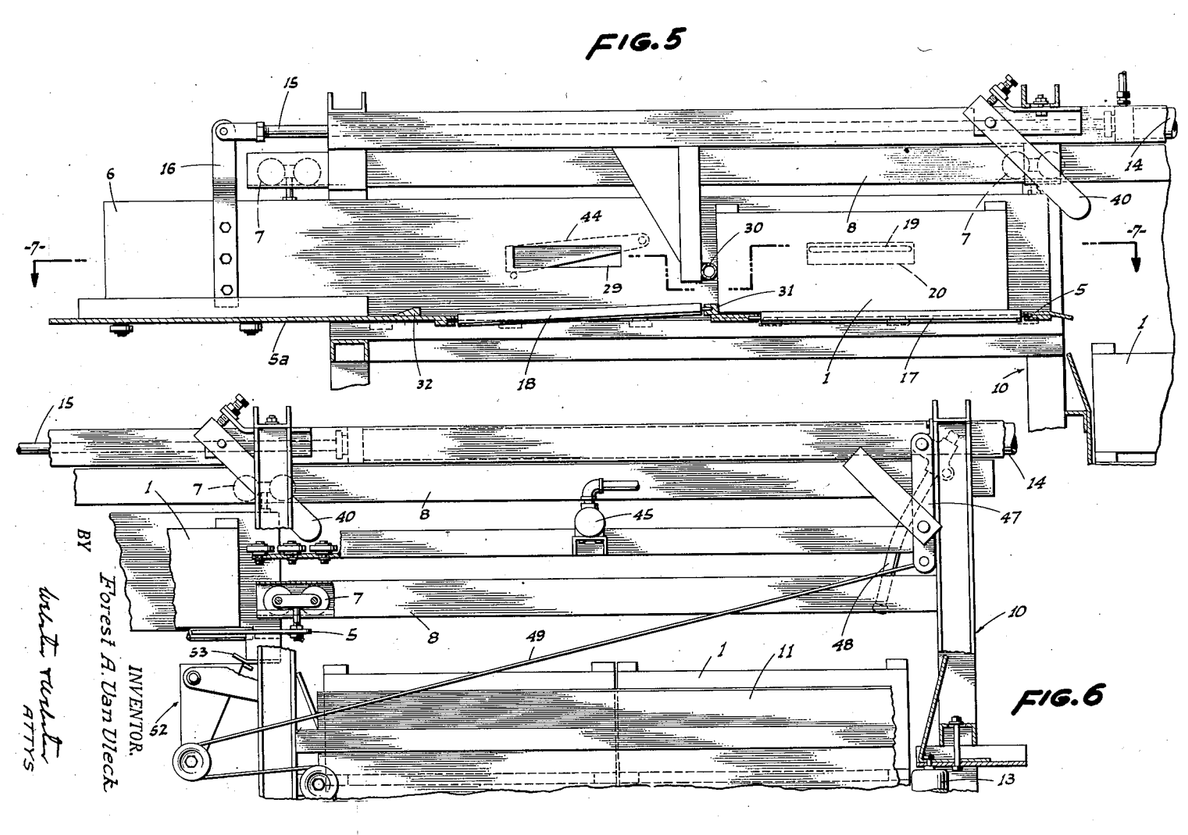
Fig. 5 is an enlarged fragmentary cross sectional elevation on line 5—5 of Fig. 1.
Fig. 6 is an enlarged fragmentary transverse elevation on line 6—6 of Fig. 1.

As the carriage 5 retracts, the disc 19 is prevented from dropping through the slot 29—which would of course shut off the cylinder 14—by means of a cover plate 44 mounted on the outer face of the wall 6 and pivoted at its forward end ahead of the slot as shown in Fig. 5. The under edge of the plate 44 slopes upwardly toward its pivoted end and such edge cuts across the path of the disc so that as the carriage 5 advances, the plate engages the disc and is lifted thereby, exposing or opening the slot 29 and allowing the disc to enter the same, the plate 44 then resting on the disc until said plate clears the disc with the further advancing movement of the carriage. The rear end of plate 44 is, however, vertical so that upon the retracting movement of the carriage from a fully advanced position, the disc rides onto the plate 44 without lifting the same. The plate 44 thus remains in a slot-closing position, and the disc cannot enter the slot. The cover plate thus blocks the slot 29 against entry of the disc 19 when the carriage retracts, but not when it advances.

Another feature to be here noted is the provision of a small, spring-retracted, pressure-advanced ram 45 mounted in the frame in position to work against the rearmost row of boxes at the end opposite the side wall 6 when the carriage 5 is fully advanced; said ram 45 being connected by a conduit 46 which receive fluid under pressure only when the cylinder 14 is energized to retract the carriage. This means that the ram 45 comes into action as the carriage 5 begins to pull back from under the two rows of boxes; the effect being to assure that the foremost row of boxes can drop without binding by the rearmost row. As shown diagrammatically in Fig. 15, the foremost row of boxes, as it escapes the carriage, is canted somewhat so that it is desirable to hold up the adjacent ends of the boxes of the rearmost row for release only after the carriage fully escapes. The ram 45 becomes deenergized and spring-returns to inactive position as soon as the power cylinder 14 has fully retracted the carriage and the valve 28 has been automatically reversed, as aforesaid.

The carriage, after such full retraction, is now in its strating position and ready for a repetition of its reciprocable operation; another row of boxes entering onto the forward roller section 17, as shown in Fig. 13. Such entry of boxes may begin before the carriage 5 is fully retracted, in which case the boxes are first received on a rear apron 5a of carriage 5, or on rearward section 18; the boxes finally resting on forward roller section 17 upon the parts 5a and 1 relatively sliding rearward to the full retracted position.

Figure 14:
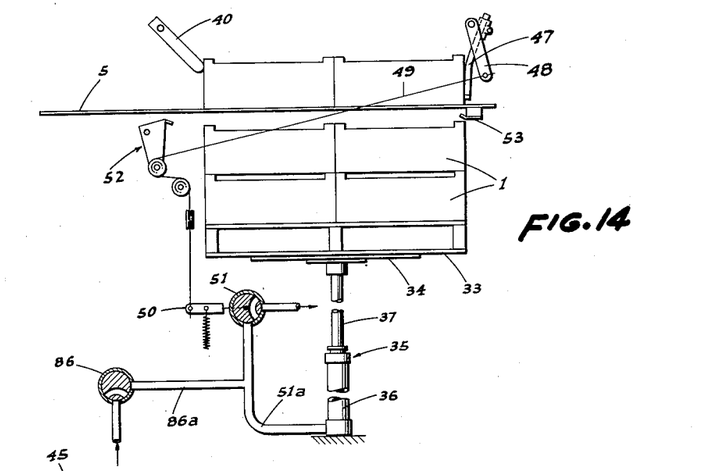
Fig. 14 is a fragmentary diagrammatic elevation of the hoist, including its power cylinder and the related control valves; the box feed carriage being fully advanced.

However, before occurrence of the next reciprocatton of the carriage 5, the hoist 35 is dropped one step or stage in order to provide clearance for the boxes next to be delivered by said carriage onto the stack which thus progressively builds up on the pallet 3. Such drop-staging of the hoist 35 is accomplished automatically as follows:

As each double row or layer of boxes is advanced to position directly above the hoist 35, a box of the foremost row engages and swings a trigger 47 which is secured in connection with and swings a pivotally mounted lever 48 in an outward direction (see Fig. 14); such lever 48 being connected by a suitably pulley-guided flexible cable 49, with the actuating lever 50 of a spring-closed valve 51.

Figures 15, 16:
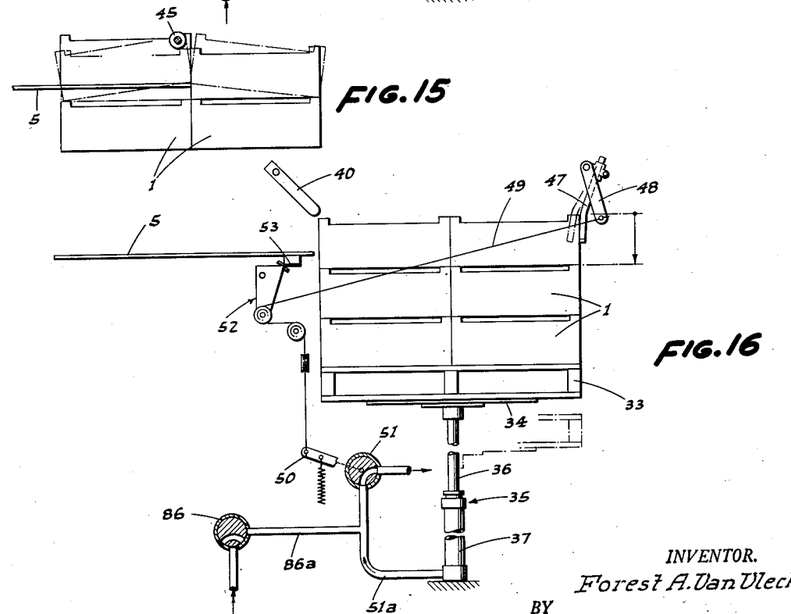
Fig. 15 is a fragmentary diagrammatic side elevation showing a row of the boxes as being released onto the stack by the retracting carriage.
Fig. 16 is a view similar to Fig. 14, but shows the carriage fully retracted.

The cable 49, as pulled by the lever 48 in response to movement of the trigger 47, acts only to swing the lever 50 and open the valve 51 after the carriage is fully retracted; this safety feature being accomplished by interposing a cable tightener unit 52 in the cable 49 intermediate its ends, and which cable tightener unit comes into play only when the carriage is fully retracted, and at which time a cam 53 on the carriage 5 works the unit 52 to take up the slack in the cable 49 (see Fig. 16).

When this occurs, the valve 51 is pulled open. As the valve 51 is in a return conduit 51a between the power cylinder 37 and the pressure return conduit 25, fluid pressure bleeds out of said power cylinder 37 when the valve 51 opens, permitting the hydraulic hoist 35 to lower a predetermined or staged distance. Upon such predetermined lowering of the hoist 35 the trigger 47 escapes from the engaged box, whereupon the cable 49 slacks and the valve 51 spring-closes, stopping the hoist at the proper point for reception of the next double row of boxes on the progressively building stack on pallet 33.

A metering valve 54 (Fig. 23) is interposed in conduit 51a to control the speed of lowering of the piston rod 36 when valve 51 is open.

With the foregoing arrangement, the carriage 5 and the hydraulic hoist 35 are recurringly but alternately actuated so that a stack of boxes progressively builds up on the pallet 33; the operation of these parts being wholly automatic under the control of the values responding to working and predetermined operative positioning of certain parts. After the stack of boxes is completely assembled on the hydraulic hoist 35 the latter occupies its lowermost position, with the pallet 33 in the bottom of the cage or housing 9 defined by the frame 10.

Figure 1:
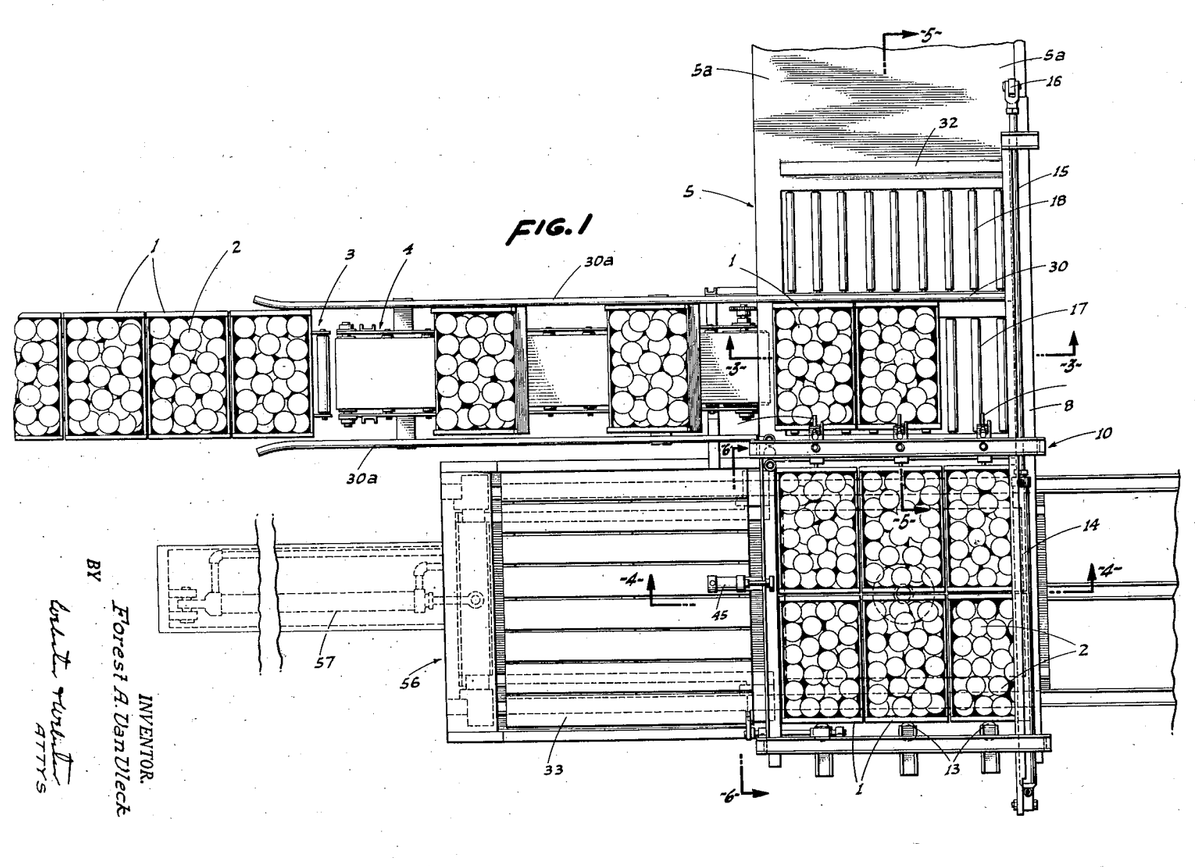
Fig. 1 is a plan view of the box stacking machine as in use.
Figure 2:
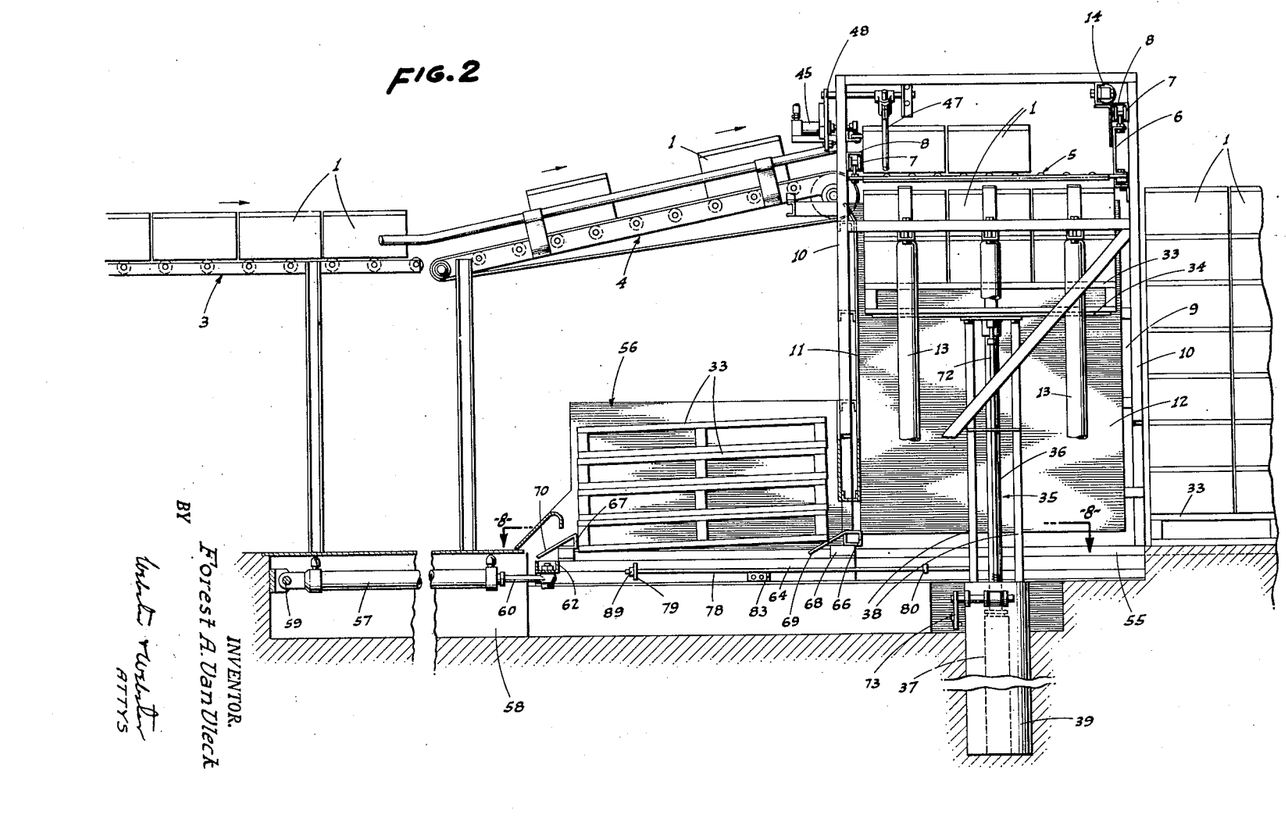
Fig. 2 is a side elevation, partly in section, of the box stacking machine.
Figure 3:
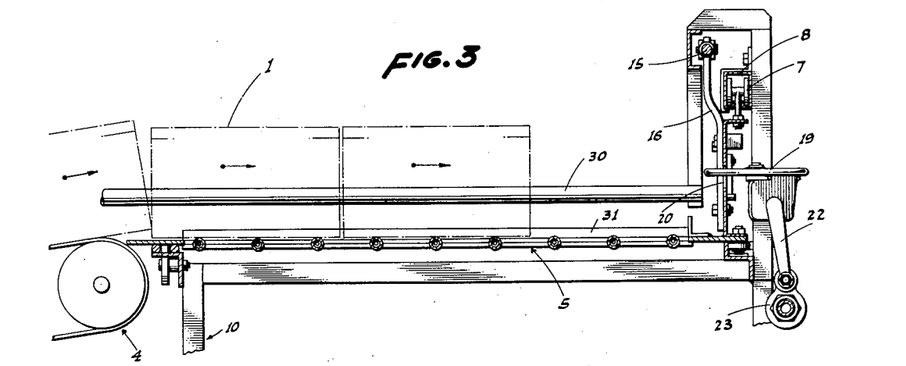
Fig. 3 is an enlarged fragmentary longitudinal section on line 3—3 of Fig. 1.
Figure 4:
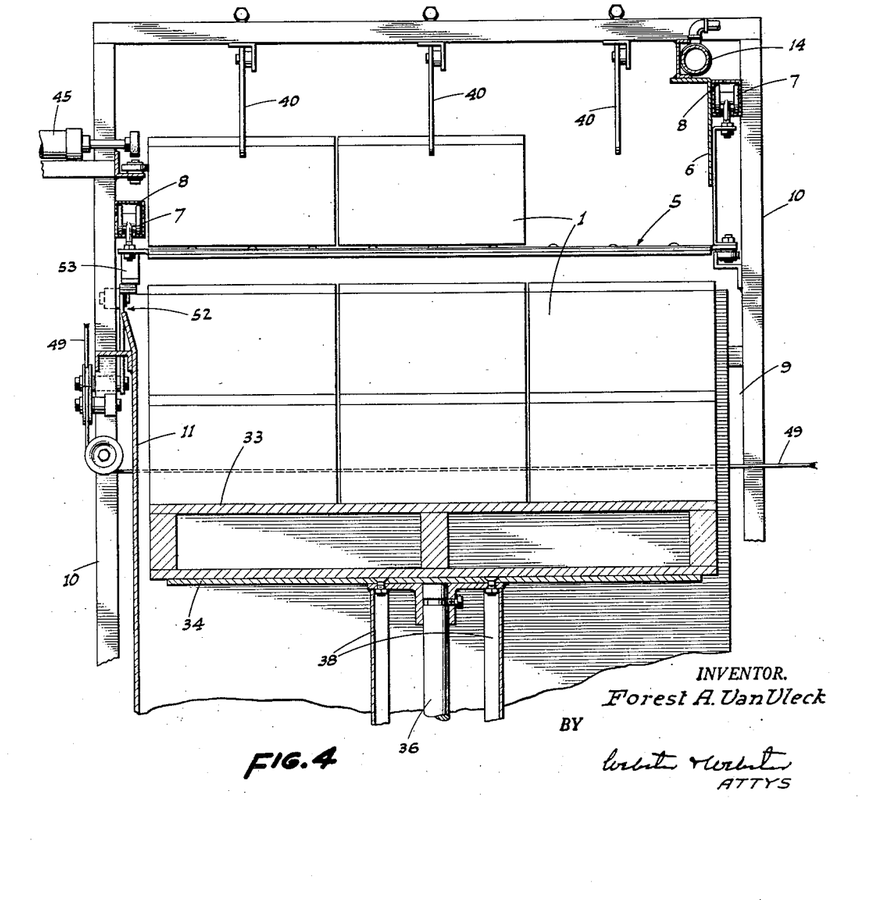
Fig. 4 is an enlarged fragmentary longitudinal section on line 4—4 of Fig. 1.

At this time such pallet, together with the stack of boxes thereon, is discharged forwardly out of said cage or housing 9 at the front and to a position for access for a fork-lift truck (see Fig. 2). At the same time a new or unloaded pallet is delivered onto the platform 34 of the hoist 35. All is accomplished by the following automatic mechanism.

Transversely spaced pallet supporting rails 55 extend at floor level through the cage or housing 9 from a point some distance rearwardly of the rear wall 11. The rearward portions of the pallet supporting rails 55 thus extend beneath a pallet hopper 56 in which a stack of the pallets 33 is disposed. The rear wall 11 terminates at its lower edge above the floor level a distance only sufficient to permit the bottom-most one of the stack of pallets 33 in the hopper 56 to feed forwardly on the pallet supporting rails 55.

A substantially horizontal, fluid pressure actuated power cylinder 57 of double-acting type is disposed in a below-floor level trough 58 which extends forwardly to a point somewhat ahead of the jacket 39 which surrounds the power cylinder 37.

The power cylinder 57 is pivotally mounted at its rear end, as at 59, and the piston rod 60 projects forwardly to connection, as at 61, with the rear cross member 62 of a pallet ejector, indicated generally at 63.

Figure 8:
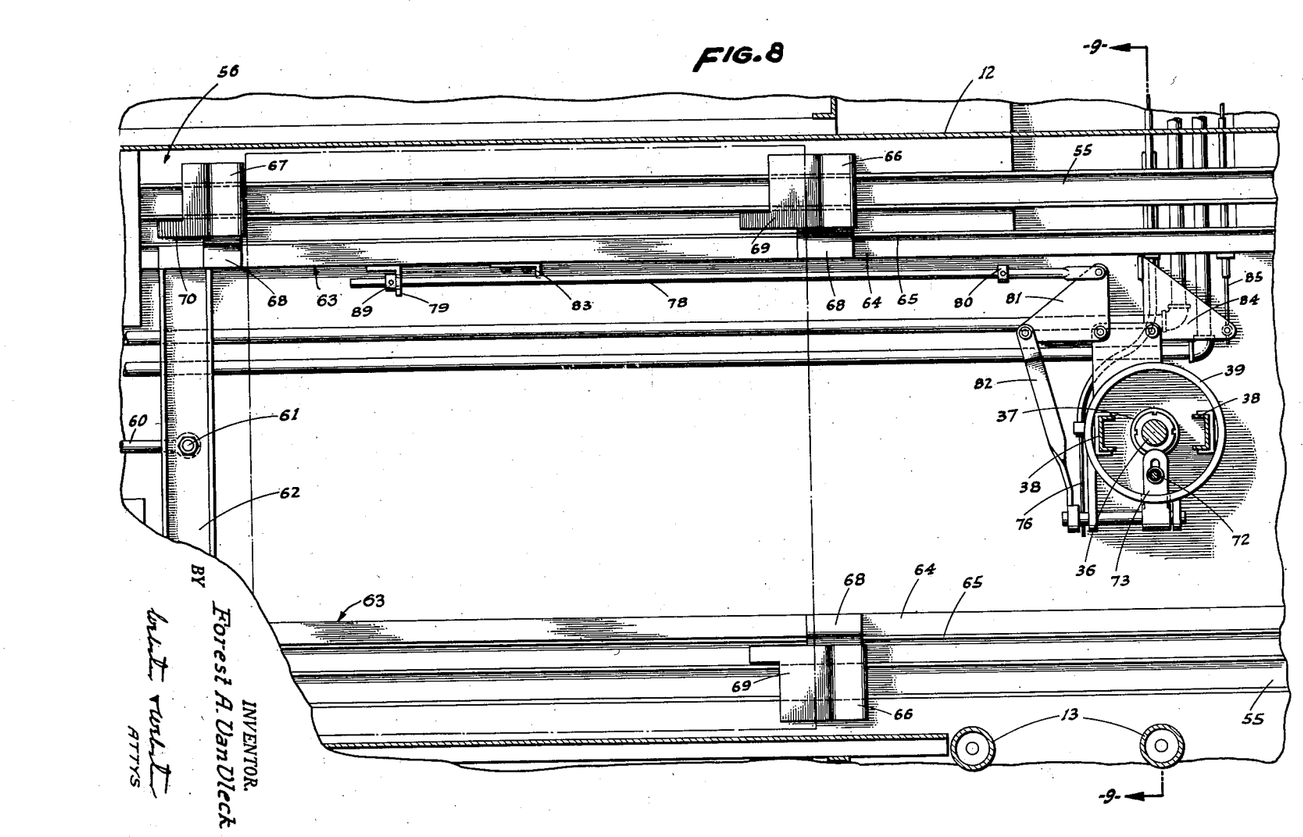
Fig. 8 is an enlarged fragmentary sectional plan on line 8—8 of Fig. 2.
Figure 9:
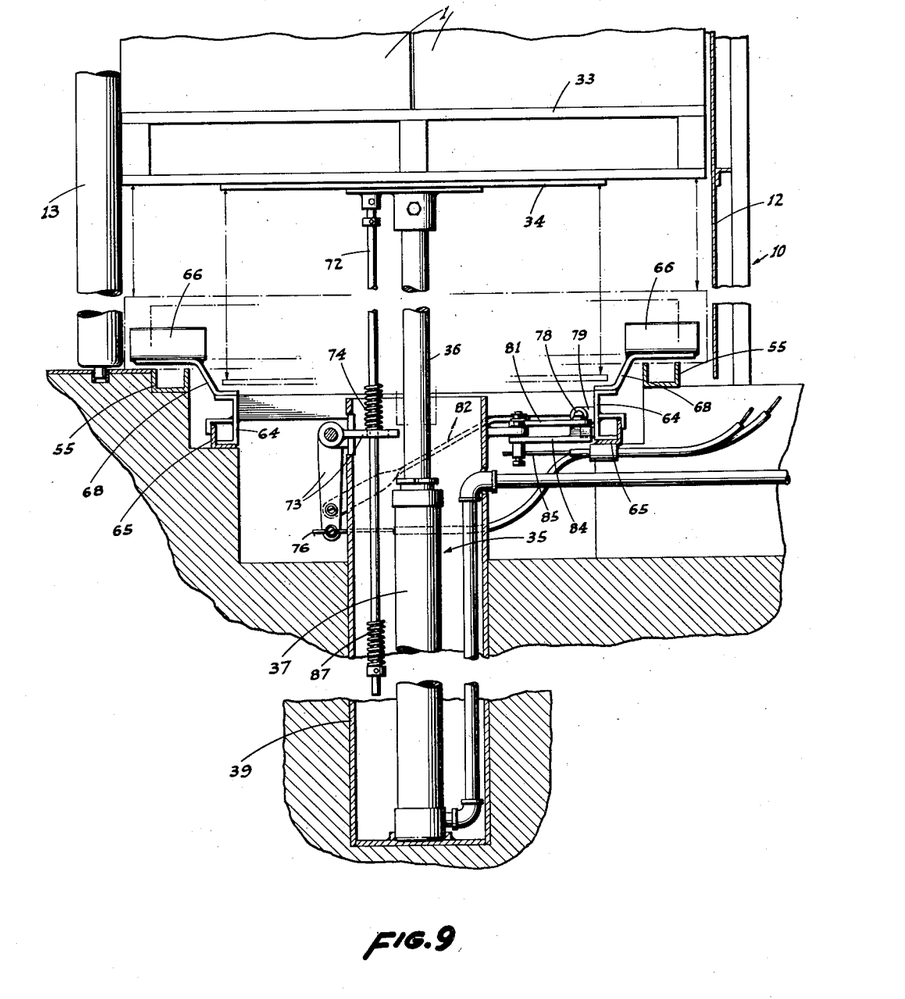
Fig. 9 is a fragmentary sectional elevation, foreshortened, on line 9—9 of Fig. 8.

The pallet ejector 63 includes, in addition to the cross member 62, transversely spaced, longitudinal side bars 64 which project forwardly in the trough 58 running on below-floor rails 65 (see Figs. 8 and 9).

The ejector 63 also includes a pair of transversely spaced front pusher blocks 66 and a pair of transversely spaced rear pusher blocks 67 which are disposed over corresponding ones of the pallet supporting rails 55, being supported in connection with the side bars 64 of the ejector 63 by rigid, lateral arms 68. The pusher blocks 66 and 67 have downwardly and rearwardly inclined cam faces 69 and 70, respectively, on the back side; the cam faces on the back side of the front pusher block 66 supporting the adjacent corner of the lowermost pallet 33 in the hopper 56, as shown in Fig. 2, whereby to hold such pallet slightly raised at the front to assure its proper entry onto the hoist, as will hereinafter appear.

The cam faces 70 on the rear pusher blocks 67 permit such blocks to retract under the stack of pallets 30 in the hopper 56 by engaging and sliding under such stack upon return of the ejector.

Figure 17:
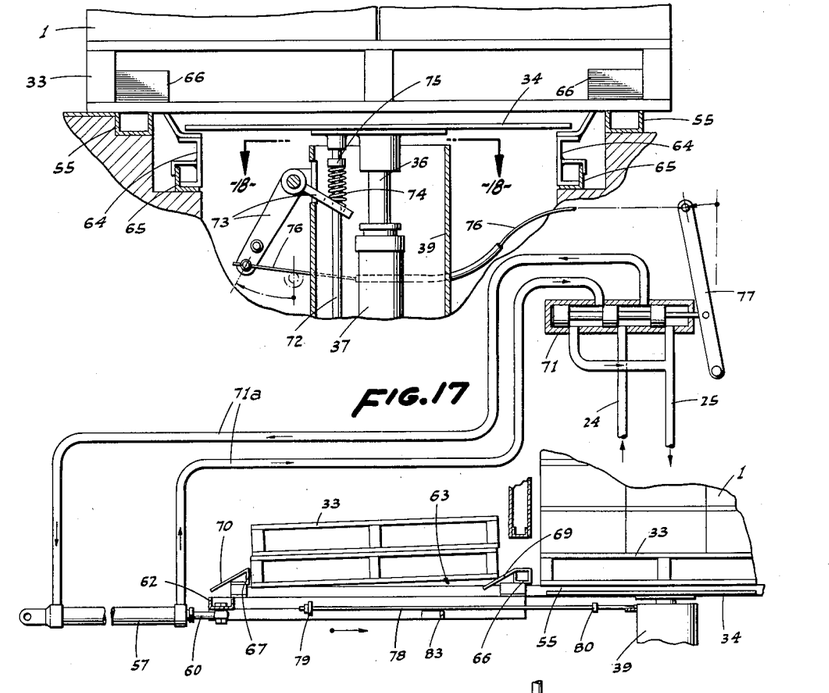
Fig. 17 is a fragmentary diagrammatic view showing, in two-part elevation, the hoist in its lowered position and the ejector starting forward; the ejector control valve and regulating mechanism being shown in their related positions.

The power cylinder 57 is controlled by a reversing valve 71 (see Fig. 17) arranged in connection with the conduits 24 and 25 of the fluid pressure conduit system; the valve 71 being connected to the cylinder 57 by a pair of conduits 71a, and normally being in a neutral position with the piston rod 60 and agitator 63 in a retracted or return position clear of the bottom of the cage or housing 9.

When the hydraulic hoist 35 reaches its low point with a full stack of boxes 1 on the hoist-supported pallet 33, the valve is shifted so that the power cylinder 57 acts to advance the ejector 63; the front pusher block 66 engaging the box-stack supporting pallet and pushing it off the hoist 35 to a position outside of the cage or housing 9 for ready access and pick-up by a fork-lift truck. The stack supporting pallet slides out of the cage or housing on the rails 55.

At the same time the rear pusher blocks 67 advance the lowermost pallet 33 from the hopper 56 forwardly beneath the lower edge of the rear wall 11 and deposit such pallet on the platform 34 of the hydraulic hoist 35.

Such shifting of the valve 71 to what may be termed its forward position is accomplished by the following automatic mechanism:

A control rod 72 is fixed to the under side of the hoist platform 34 and depends downwardly in adjacent parallel relation to the piston rod 36, slidably engaging through one arm of a bellcrank lever 73 mounted on a horizontal axis in connection with the upper end portion of the jacket 39.

As the hoist 35 reaches its lowermost limit, a helical compression spring 74 on rod 72 is compressed between such arm of the bellcrank lever 73 and a top collar 75 on the rod. This swings the bellcrank lever 73 in the manner shown in Fig. 17, which lever in turn pulls on a control wire 76 connected to the other leg of such lever. The control wire 76, which runs through a suitable sheath, is attached at the other end to a swing arm 77 which controls the position of the reversing valve 71. The reversing valve 71 is mounted at any suitable point on the apparatus, being interposed in the conduit system, as shown, and being of a generally conventional three-position type. By "three-position" is meant that the valve 71 has a forward position in which the cylinder 57 is advanced; a return position in which said cylinder is retracted; and a neutral position in which said cylinder stands idle.

Immediately upon the cylinder 57 fully advancing the ejector 63, the valve 71 is shifted to a neutral position, whereupon said cylinder becomes idle and the ejector stands still in its advanced position. This is accomplished by a control rod 78 which lies lengthwise along one of the ejector side bars 64, being slidable in an ear 79 thereon.

Figure 18:
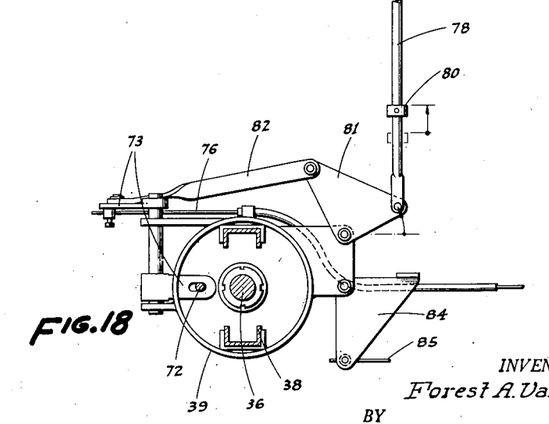
Fig. 18 is a fragmentary diagrammatic sectional plan on line 18—18 of Fig. 17.

When the ejector 63 reaches full advance, the ear 79 engages a collar 80 on rod 78, advancing such rod, and the latter in turn swings a bellcrank plate 81 which—through the medium of a link 82 connected to the bellcrank lever 73—swings the latter enough to shift the valve 71 to its neutral position. (See Figs. 18, 19, and 20.) The bellcrank lever 73 can be so shifted for the reason that the spring 74 permits of considerable compression thereof, as particularly shown in Fig. 20.

At the same time an abutment 83 on said one side bar 64 engages and part-rotates another bellcrank plate 84 whose opposite end is connected by a control wire 85 to a suitably mounted, normally spring-closed valve 86 interposed, by conduit means including a conduit 86a, between the fluid pressure feed conduit 24 and the power cylinder 37 of the hoist. The control wire 85 is suitably sheathed, and the valve 86 is located at an appropriate point on the apparatus. When the bellcrank plate 84 is engaged and part-rotated by the abutment 83, as the ejector 63 reaches maximum advance (see Fig. 19), the control wire 85 pulls valve 86 open, whereupon fluid pressure immediately is delivered to the power cylinder 37, and the hoist 35—with a new pallet 33 resting on the platform 84—runs upwardly relatively fast to its maximum raised or starting position.

Figures 19, 20, 21, 22:
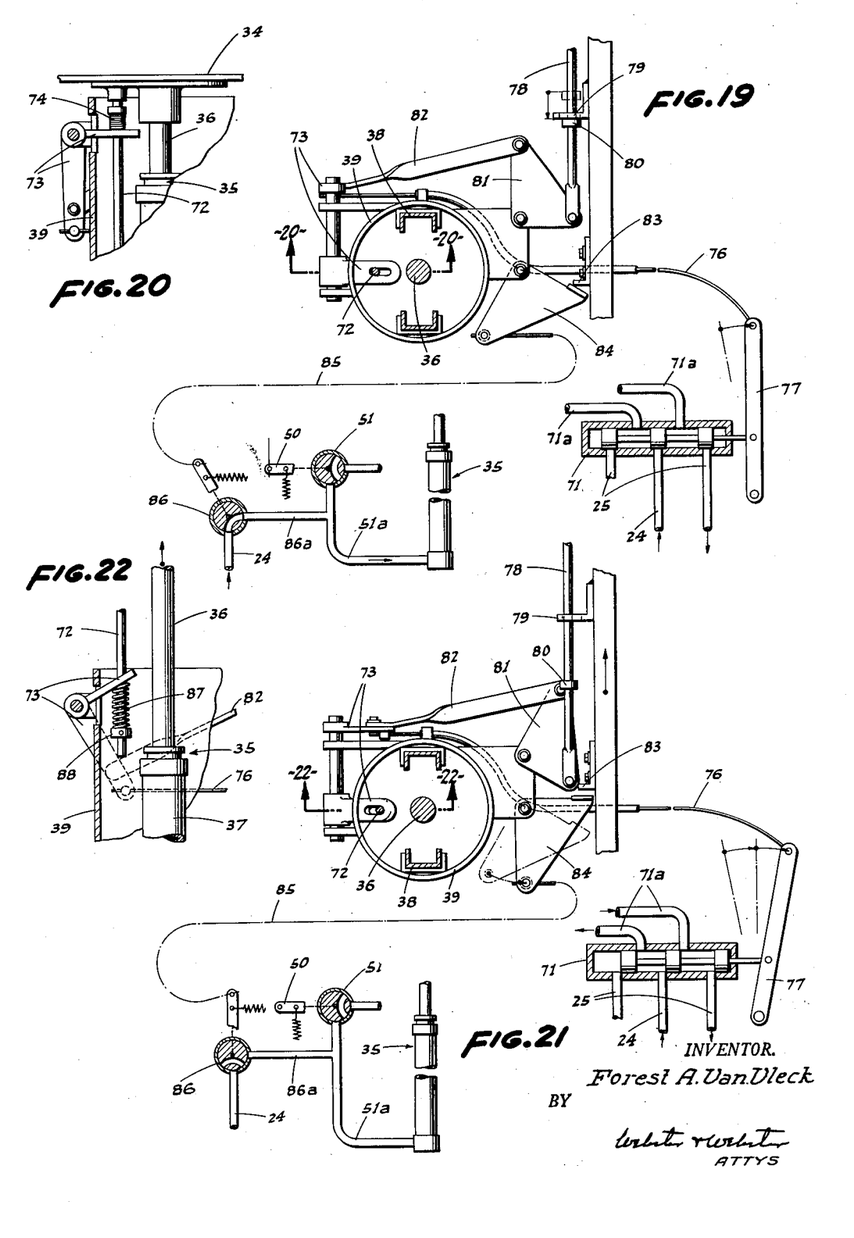
Fig. 19 is a fragmentary diagrammatic sectional plan, similar to Fig. 18, but shows the hoist actuated, valve regulating mechanism in the position thereof when the hoist is lowered and the ejector forward.
Fig. 20 is a fragmentary elevation on line 20—20 of Fig. 19.
Fig. 21 is a view similar to Fig. 19, but shows the hoist actuated, valve regulating mechanism in the position thereof with the hoist raised and the ejector starting to retract.
Fig. 22 is a fragmentary elevation on line 22—22 of Fig. 21.

When the hoist 35 reaches its raised position, as above, a helical compression spring 87 on rod 72, between a low mounted collar 88 and the related arm of the bellcrank lever 73, works against such arm and swings said lever 73 in a direction such that the reversing valve 31 is shifted to its return position (see Figs. 21 and 22). When this occurs, the cylinder 57 retracts to starting position, pulling or retracting the ejector 63 rearwardly to a corresponding starting position, and at which position it then remains at rest awaiting the next cycle of operations. The power cylinder 57 thus remains at rest for the reason that as it reaches its position of full retraction the ear 79 engages a rear collar 89 on rod 78, shifting the latter rearwardly in a direction which swings the bellcrank lever 73 to a position in which the reversing valve 71 is in neutral.

Upon such retraction of the ejector 63 the abutment 83 pulls back from the bellcrank plate 84, permitting the hoist control valve 86 to spring-close, which is its normal position. During the foregoing cycle of operations, including the advance of the ejector 63, raising of the hoist 35 to its starting position for the next cycle, and the return of said ejector to its starting position, the power cylinder 14 for the carriage 5 is starved for fluid pressure whereby the carriage does not get out of cycle. Such starving of pressure to the cylinder 14 is occasioned of course by the fluid pressure demands imposed on the system particularly by the power cylinder 57 as its advances, and the hydraulic hoist 35 as it returns to starting position.

Another reason why the cylinder 14 for the carriage 5 does not get out of time is that it works at a very slow travel, giving the hoist—which works relatively fast—ample times to return to its raised starting position before the carriage 5 comes forward and discharges its next box load. Additionally, a pressure reducing valve 90 is interposed in the conduit system to regulate the amount of pressure which can deliver for use by the power cylinder 37 of the hoist 35 and the power cylinder 14 of the carriage 5.

Upon the hydraulic hoist 35 returning to its raised starting position, the carriage 5 begins its reciprocable operation, and the entire cycle repeats as described.

Thus, without manual attention, the machine works smoothly and positively to stack produce boxes on a pallet and to then discharge the loaded pallet for pick-up and carry-off by a fork-lift truck.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In a box stacking machine, a conveyor for a single-file row of boxes to be stacked, an elevator disposed to one side of and beyond the discharge end of the conveyor and including a box supporting platform of a size to receive a plurality of boxes in separate side-by-side rows parallel to the conveyor and initially disposed at a level adjacent but below that of the discharge end of the conveyor, a horizontal carriage alined with the platform transversely of the conveyor and disposed at a level above the platform and to receive boxes from the discharge end of the conveyor, means mounting the carriage for movement transversely of the conveyor from a position with one end adjacent the side edge of the conveyor nearest the platform to a position over the platform with said end substantially vertically alined with the edge of the platform furthest from said side edge of the conveyor, normally inactive mechanism to so advance the carriage and to retract the same, means actuated by movement of a row of boxes from the conveyor onto the carriage and including a relatively stationary element alined with the conveyor in position to be engaged by the foremost box of a row to place said mechanism in operation to advance the carriage, and means included in part with said element to cause such advance to be halted upon said row of boxes being shifted to clear the conveyor whereby to enable a subsequent row of boxes to be fed onto the carriage from the conveyor to again engage the element and cause a further advance of the carriage to be effected, so that the carriage then wholly overlies the platform; there being means to engage and hold the boxes of the rearmost row against retractive movement whereby when the carriage is retracted the rows of boxes will remain over the platform and will drop onto the same; said mechanism comprising a hydraulic ram and a conduit system for the ram having a fluid control valve therein, and said element is a disc connected to the valve, the latter being open when the disc moves away from the conveyor; the second named means including a back wall fixed with the carriage and forming a back stop against which the rows of boxes fed from the conveyor abut, the back wall having longitudinally spaced front and rear slots, one alined with each position of a row of boxes on the conveyor, through which the disc projects, to then close the valve, when not engaged by a box; the back wall being relatively thin whereby when a box engages the front face of said wall and the disc, the latter may roll against the rear face of the wall upon advance of the carriage and hold the valve open.

2. A machine as in claim 1, with a separate valve in the conduit system arranged to be opened to actuate the ram in a carriage retracting position; and a plate pivoted on the back wall on the front side thereof over and at the front end of the rear slot, the under edge of the plate sloping upwardly toward its pivoted end and cutting across the path of the disc so that as the carriage advances the plate engages the disc and is lifted to allow the disc to enter the slot, but will remain in a slot covering position upon a retracting movement of the carriage so that the disc then engages and moves along the plate and the valve will remain open until the carriage is fully retracted.

3. In a box stacking machine, a conveyor for a single-file row of boxes to be stacked, an elevator disposed to one side of and beyond the discharge end of the conveyor and including a box supporting platform of a size to receive a plurality of boxes in separate side-by-side rows parallel to the conveyor and initially disposed at a level adjacent but below that of the discharge end of the conveyor, a horizontal carriage alined with the platform transversely of the conveyor and disposed at a level above the platform and to receive boxes from the discharge end of the conveyor, means mounting the carriage for movement transversely of the conveyor from a position with one end adjacent the side edge of the conveyor nearest the platform to a position over the platform with said end substantially vertically alined with the edge of the platform furthest from said side edge of the conveyor, normally inactive mechanism to so advance the carriage and to retract the same, means actuated by movement of a row of boxes from the conveyor onto the carriage and including a relatively stationary element alined with the conveyor in position to be engaged by the foremost box of a row to place said mechanism in operation to advance the carriage, means included in part with said element to cause such advance to be halted upon said row of boxes being shifted to clear the conveyor whereby to enable a subsequent row of boxes to be fed onto the carriage from the conveyor to again engage the element and cause a further advance of the carriage to be effected, so that the carriage then wholly overlies the platform; there being means to engage and hold the boxes of the rearmost row against retractive movement whereby when the carriage is retracted the rows of boxes will remain over the platform and will drop onto the same; a back wall on the carriage against which the rows of boxes abut when fully fed onto the carriage, a normally retracted pressure advanced ram mounted on the machine in position to engage the box of said subsequent row furthest from the back wall and press said boxes against each other and against said back wall, and means placed in operation upon the retraction of the carriage to actuate said ram and hold the same advanced until the carriage is retracted from under said subsequent row of boxes.

4. In a box stacking machine, an elevator including a box supporting platform, a vertical hydraulic ram to raise and lower the platform, a pressure conduit connected to the ram and a valve in the conduit, the valve being normally closed to confine pressure in the ram and hold the platform in an initially raised position; a reciprocating carriage to convey boxes to the platform and movable over the platform in clearance relation thereto upon a full advance of the carriage, means to maintain the boxes against retractive movement from over the platform upon the retraction of the carriage whereby the boxes may drop onto the platform, valve actuating means mounted on the machine, a movable element included with said means engaged and moved by a fully advanced box to move the valve toward an open position, and a device included with said means and mounted in part on the carriage and actuated upon movement of the carriage to a fully retracted position to complete the opening of the valve whereby to allow pressure to escape from the ram and cause the platform to be lowered.

5. In a box stacking machine, an elevator including a box supporting platform, a vertical hydraulic ram to raise and lower the platform, a pressure conduit connected to the ram and a valve in the conduit, the valve being normally closed to confine pressure in the ram and hold the platform in an initially raised position; a reciprocating carriage to convey boxes to the platform and movable over the platform in clearance relation thereto upon a full advance of the carriage, means to maintain the boxes against retractive movement from over the platform upon the retraction of the carriage whereby the boxes may drop onto the platform, valve actuating means mounted on the machine, a movable element included with said means engaged and moved by a fully advanced box to move the valve toward an open position, and a device included with said means and mounted in part on the carriage and actuated upon movement of the carriage to a fully retracted position to complete the opening of the valve whereby to allow pressure to escape from the ram and cause the platform to be lowered; said valve actuating means comprising a cable connected at one end to the valve and arranged to open the valve upon pulling the cable a predetermined distance, said element comprising a lever unit pivoted in a fixed position on the machine above the platform and depending for box-end engagement and to the lower end of which the other end of the cable is connected; said device comprising a cable tightener swingably mounted on the machine, and a cam on the carriage in position to actuate the tightener in a direction to pull on and move the cable in a valve opening direction.

6. A structure as in claim 5, in which the lever unit is arranged to be disengaged from the box only when the latter has been moved down, with the elevator platform, a distance equal to the height of the box whereby to release the pull of said lever unit on the cable, and spring means to then move the valve to a closed position.

References Cited in the file of this patent

UNITED STATES PATENTS

| | | |
|---|---|---|
| 814,454 | Keyes | Mar. 6, 1906 |
| 1,129,214 | McIlvried | Feb. 23, 1915 |
| 1,551,890 | Luce | Sept. 1, 1925 |
| 1,674,319 | Cranston | June 19, 1928 |
| 2,065,674 | Fay | Dec. 29, 1936 |
| 2,234,990 | Todhunter | Mar. 18, 1941 |
| 2,508,861 | Jessen | May 23, 1950 |
| 2,616,573 | Grady | Nov. 4, 1952 |
| 2,701,650 | Stevenson | Feb. 8, 1955 |